United States Patent [19]

Kano

[11] Patent Number: 5,871,293

[45] Date of Patent: *Feb. 16, 1999

[54] TAPE PRINTER

[75] Inventor: Toshiyuki Kano, Tokyo, Japan

[73] Assignee: Max Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 728,064

[22] Filed: Oct. 9, 1996

[30] Foreign Application Priority Data

| Oct. 9, 1995 | [JP] | Japan | 7-261534 |
| Oct. 9, 1995 | [JP] | Japan | 7-261535 |
| Oct. 9, 1995 | [JP] | Japan | 7-261833 |

[51] Int. Cl.$^6$ .......................................... B41J 5/30
[52] U.S. Cl. ............................ 400/615.2; 400/61; 400/70
[58] Field of Search ................................. 400/489, 582, 400/586, 615.2, 61, 62, 70

[56] References Cited

U.S. PATENT DOCUMENTS 5,414,422  5/1995  Allen ...................................... 400/489
5,480,246  1/1996  Morimoto ............................. 400/615.2
5,524,240  6/1996  Barbara et al. ......................... 395/600

*Primary Examiner*—John Hilten
*Attorney, Agent, or Firm*—Jacobson, Price, Holman & Stern, PLLC

[57] ABSTRACT

A tape printer includes a keyboard (4) that inputs character strings to be printed on each printed block that is defined in a label tape or a label tube and inputs control commands by which an output format of the character strings is controlled; a display portion (10) that displays the character strings and the control commands that have been input, a memory portion (8) that stores the character strings and the control commands that have been input; a thermal head (13) for printing the character strings stored in the memory portion on each block of the label tape or the label tube on the basis of the control commands stored in the memory portion; a memory (58) that registers printing data that is displayed on the display portion in correspondence with a specific key; and a CPU (7) that causes the printing data registered by the memory to be displayed following an end of the character strings displayed on the display portion and, at the same time, storing the printing data in the memory portion by operating the specific key.

8 Claims, 14 Drawing Sheets

TAPE PRINTER

BACKGROUND OF THE INVENTION

1. Field of the Invention

This invention relates to a tape printer which prints characters or the like on a label tape or a label tube.

2. Description of the Prior Art

A tape printer is known in which, for example, the terminal numbers of electric utility equipment are printed on a label tape. There is a case in which character strings, such as "COM1", "COM2", . . . , "COM5", "XY01", "COM6", "COM7", . . . , "COM10", "XY02", "XY03", . . . , "XY07", . . . , are printed on predetermined blocks (i.e., predetermined printing spaces) of a label tape, respectively, by the use of the tape printer.

In this case, if the letters and numbers "C", "0", "M", "X", "Y", "0", "1", . . . "10", . . . are input by key operations one by one, the key operations must be carried out many times troublesomely. As a solution to this problem, the tape printer is provided with a consecutive-number function which allows the numbers "01", "02", . . . "05", . . . to be input by operating a single key if the numbers are arranged consecutively.

However, disadvantageously, the letters "C", "0", "M", "X", and "Y" must be input one by one with respect to each block to which the letters belong even in the same character string, such as "COM" or "XY", repeatedly appears on the tape. This operation for inputting them involves a great difficulty.

Further, disadvantageously, a screen on which characters input by the key operations are displayed in confined within very narrow limits as a result of making the tape printer small-sized and light-weight, and accordingly the number of characters which the screen can display is eight or so. This makes it difficult to determine the ordinal position of a block of the tape to which a character being currently input belongs. Further, disadvantageously, much time is taken when character strings which have been input are corrected in such a way that a cursor is moved to a character string to be corrected and thereafter the character string is displayed on the screen, because a moving range within which the cursor can move at a time is only one character space.

SUMMARY OF THE INVENTION

It is an object of the present invention to provide a tape printer capable of inputting character strings with ease even when the same character string is repeatedly printed.

It is another object of the present invention to provide a tape printer in which a cursor is forwarded fast.

It is still another object of the present invention to provide a tape printer capable of definitely showing the ordinal position of a block to which a currently input character string belongs.

A feature of the present invention is that, in a tape printer comprising input means for inputting character strings to be printed on each block which is defined in a label tape or a label tube and inputting control commands by which an output format of the character strings is controlled, display means for displaying the character strings and the control commands which have been input, storage means for storing the character strings and the control commands which have been input, and printing means for printing the character strings stored in the storage means on each block of the label tape or the label tube on the basis of the control commands stored in the storage means, the tape printer further comprises registration means for registering printing data which is displayed on the display means in correspondence with a specific key, and copying means for causing the printing data registered by the registration means to be displayed following an end of the character strings displayed on the display means and, at the same time, storing the printing data in the storage means by operating the specific key.

Further, a feature of the present invention is that, in a tape printer comprising input means for inputting character strings to be printed on each block which is defined in a label tape or a label tube and inputting control commands by which an output format of the character strings is controlled, display means for displaying the character strings and the control commands which have been input at a position of a cursor, storage means for storing the character strings and the control commands which have been input, and printing means for printing the character strings stored in the storage means on each block of the label tape or the label tube on the basis of the control commands stored in the storage means, the tape printer further comprises cursor jump means for moving the cursor to a desired block of the label tape or the label tube.

Further, a feature of the present invention is that, in a tape printer comprising input means for inputting character strings to be printed on each block which is defined in a label tape or a label tube and inputting control commands by which an output format of the character strings is controlled, display means for displaying the character strings and the control commands which have been input at a position of a cursor, storage means for storing the character strings and the control commands which have been input, and printing means for printing the character strings stored in the storage means on each block of the label tape or the label tube on the basis of the control commands stored in the storage means, the display means includes an order indicating section which indicates the ordinal position of a block in which the cursor is situated.

BRIEF DESCRIPTION OF THE DRAWINGS

FIG. 9 (A) is a descriptive drawing of a screen shown before a character string and the like are copied.

DETAILED DESCRIPTION OF THE PREFERRED EMBODIMENTS

Embodiments of a tape printer according to the present invention will be described with reference to the attached drawings.

First Embodiment

Figure 1:
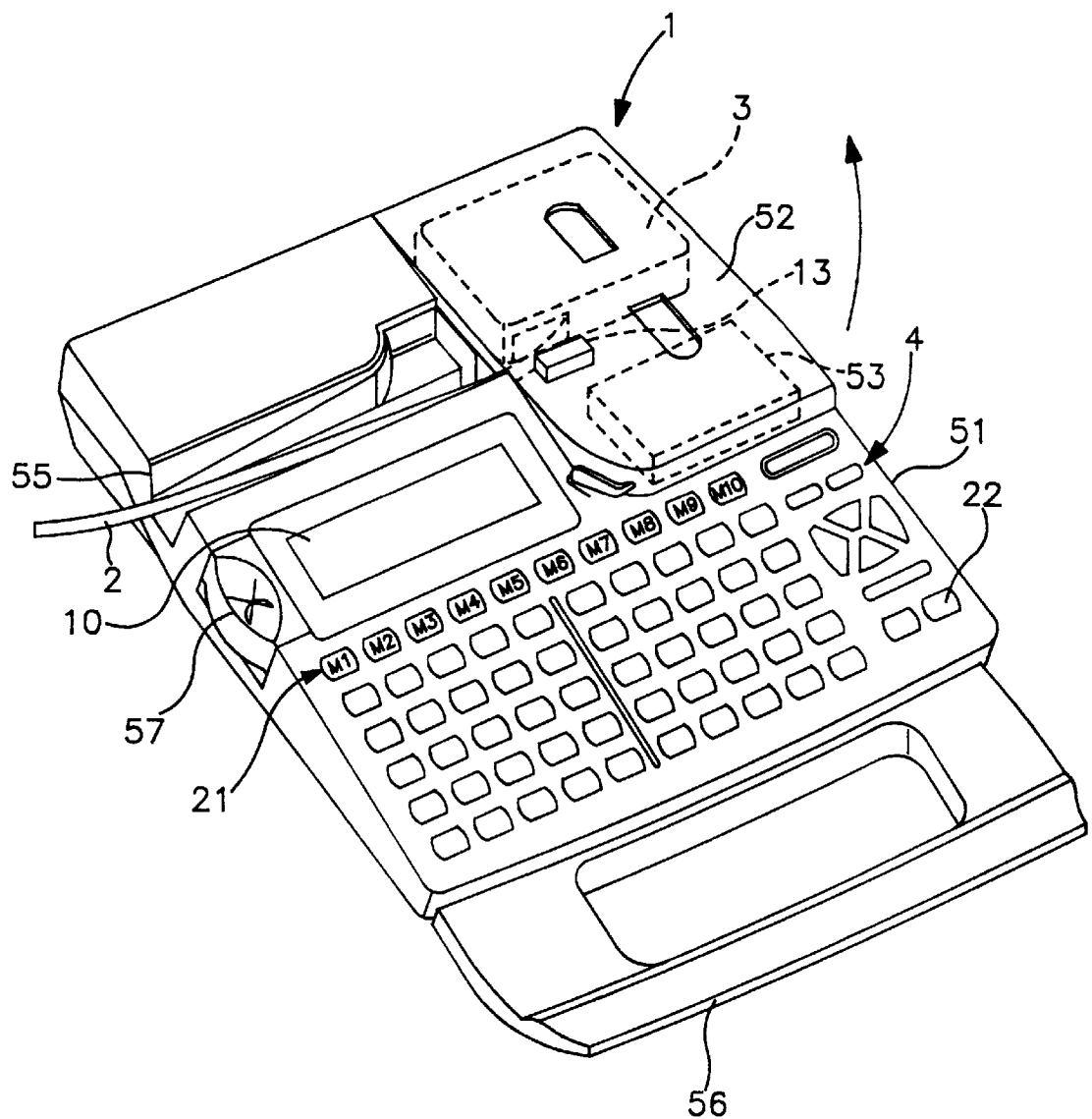
FIG. 1 is a perspective view of the exterior of a tape printer according to the present invention.

In FIG. 1, reference numeral 51 designates a printer body of a tape printer 1. The printer body 51 includes a key portion 4, a display portion 10 made of, for example, liquid crystal for displaying characters or commands input by operating the key portion 4, and a cassette cover 52 capable of opening in the direction of an arrow in the drawing. The display portion 10 can display eight characters at the maximum.

A plurality of character-keys and a plurality of command-keys used to designate a printing style of characters to be printed are disposed in the key portion 4. In addition, a plurality of registration-keys M1 through M10, a determination-key 22, and setting-keys for setting various functions are disposed therein.

The registration-keys are operated to register character strings or commands. For example, a command by which the character string "ABC" and a printing style of this character string are controlled is registered in correspondence with key M1, and likewise a command by which the character string "FGI" and a printing style of this character string are controlled is registered in correspondence with key M2.

A tube cassette 3 containing an electric-wire tube 2 and an ink ribbon cassette 63 containing an ink ribbon (not shown) are replaceably attached to the printer body 51 on the lower side of the cassette cover 52. The cassette cover 52 is opened to replace the cassettes 3 and 53. Instead of the tube cassette 3, a tape cassette (not shown) containing a tape is attachable to the printer body 51.

The printer body 51 additionally includes a motor (see FIG. 2) by which the ink ribbon, as well as the tube 2 of the tube cassette 3 or the tape of the tape cassette, is delivered, a thermal head (printing means) 13 by which characters or the like are printed on the delivered tube 2 or tape via the ink ribbon, a cutter (not shown) which cuts the tube 2 at its predetermined position, and a cassette identification sensor 54 (see FIG. 2) which identifies the type, width, etc. of the cassette 3 attached to the printer body 51. Reference numeral 55 designates a passage through which the tube 2 or tape is guided out of the printer body 51, and reference numeral 56 designates a handle formed integrally with the printer body 51.

The cutter cuts the tube 2 or tape at its predetermined position by pushing a scissors-button. The printer body 51 additionally includes an electric cutter 15 (see FIG. 2) which automatically performs half-cutting so as to make an incision in the tube 2 or tape at its predetermined position.

The cassette identification sensor 54 comprises, for example, a limit switch (not shown) or photosensor (not shown) which reads identification holes or identification codes provided in, for example, a body of the cassette 3.

Figure 2:
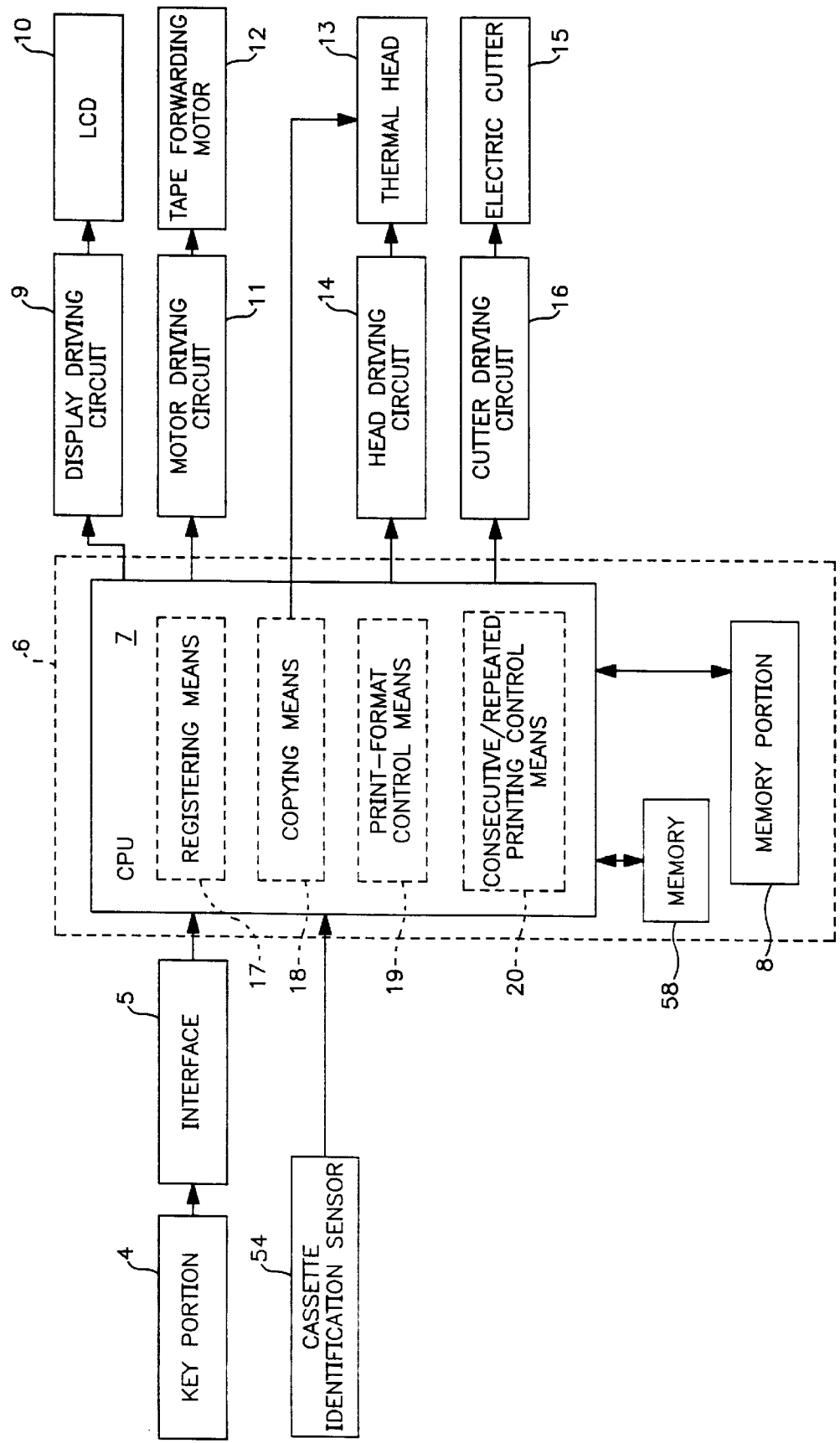
FIG. 2 is a block diagram of the construction of a control system of the tape printer of FIG. 1.

FIG. 2 is a block diagram showing the construction of a control system of the tape printer 1. In FIG. 2, reference numeral 9 designates a display driving circuit for actuating and causing the display portion 10 to display the contents of input data, reference numeral 11 designates a motor driving circuit for actuating a tape forwarding motor 12 and sensing out the tube 2, tape, and ink ribbon, reference numeral 14 designates a head driving circuit for actuating the thermal head 13, and reference numeral 16 designates a cutter driving circuit for actuating the electric cutter 15.

Reference numeral 5 designates an interface by which data input by operating the key portion 4 is input to a CPU 7.

Reference numeral 6 designates a controller including the CPU 7, a memory portion 8, and a memory 58. The CPU 7 controls the display portion 10. The memory portion 8 includes a RAM and a ROM. The RAM stores character strings input by operating the key portion 4 and the commands of the character strings, and the ROM stores a control program required for printing and other programs.

The CPU 7 includes a registering means 17 for registering character strings or commands displayed on the display portion 10 in the memory 58 in correspondence with a desired key of the keys M1 through M10, a copying means 18 for causing the display portion 10 to display the character strings or commands registered in the memory 58 and storing them, a print-format control means 19 for converting the character strings stored in the memory portion 8 to dot data and transferring the dot data to the thermal head 13 so that the character strings are printed according to the commands and the print format, and a control means 20 for consecutive/repeated printing.

Figure 3:
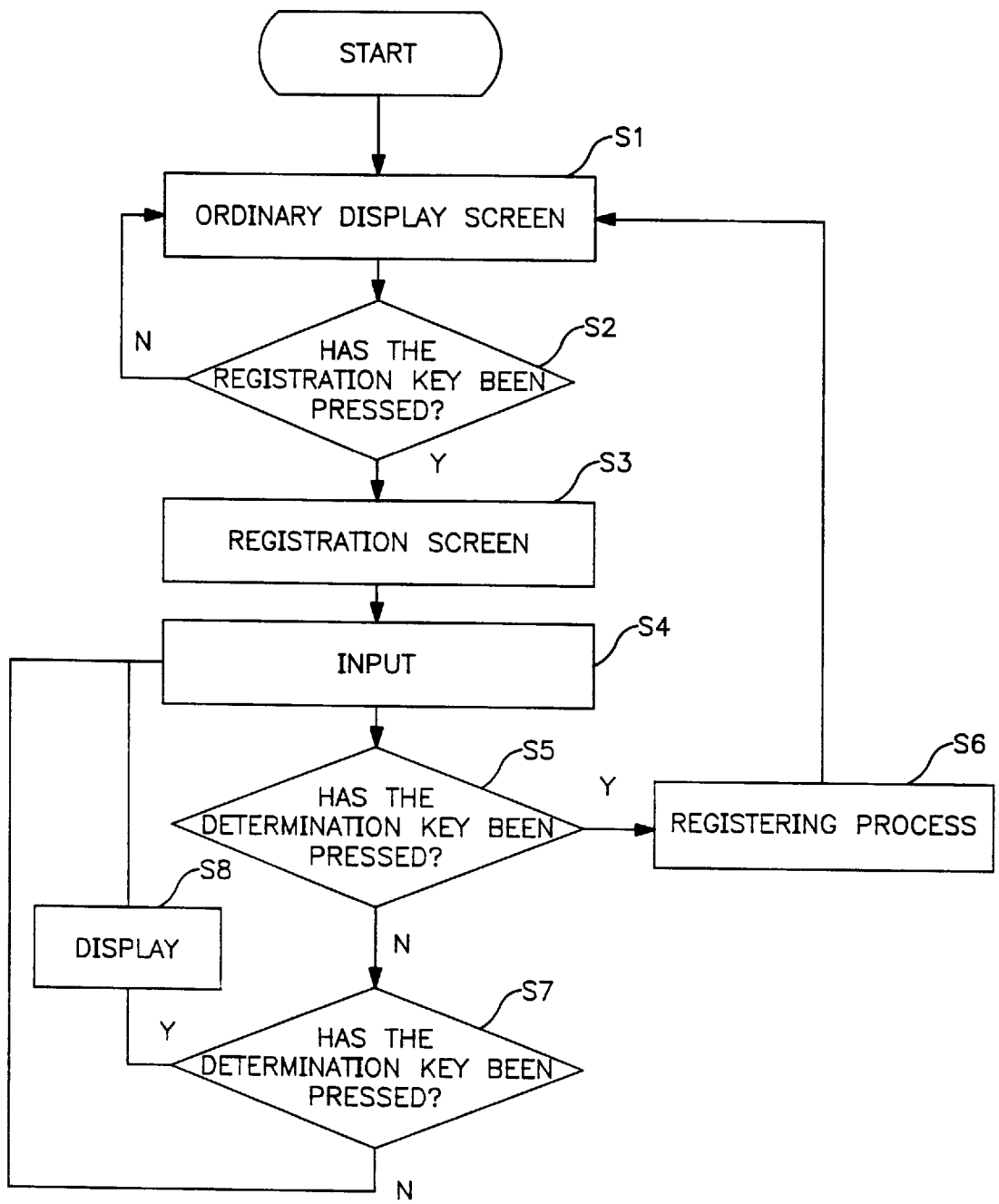
FIG. 3 is a flowchart of the operation of the tape printer.

The operation of the aforementioned embodiment will now be described with reference to a flowchart of FIG. 3.

First of all, a main switch (not shown) is turned on to actuate the controller 6 and the respective circuits. Thereby, the display portion 10 displays a picture of an ordinary screen (Step 1). On the ordinary screen, a menu page appears first. A given item is selected from a menu shown on the menu page, so that a page for displaying characters to be input appears.

The menu consists of various items, such as a print format for designating a character size or a block pitch according to which characters are printed on the tube 2, consecutive printing, and repeated printing of the same character string. A desired print-format or a setting mode is selected from the menu. This selection is made by operating selection-keys of a keyboard 4. The print format or setting mode which has been selected is stored in the memory portion 8.

In Step 2, a judgment is formed as to whether one or keys M1–M10, each functioning as a registration key 21 of the keyboard 4, has been operated or not. If not, the stage returns to Step 1. In other words, while characters to be printed, for example, are being input by normal operations, the procedures of Steps 1 and 2 are carried out so that the input characters or the like are displayed on the display portion 10. As a result, data about the input characters is stored in the memory portion 8.

Figure 4:
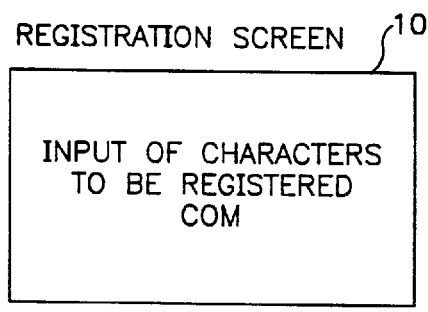
FIG. 4 is a descriptive drawing of a registration picture displayed on a display portion of the tape printer of FIG. 1.

After that, if key M1, for example, is operated, a "yes" judgment is formed in Step 2, and the stage proceeds to Step 3. In Step 3, a registration page (a registration screen) is displayed on the display portion 10, as shown in FIG. 4. The phrase "INPUT OF CHARACTERS TO BE REGISTERED" appears on the registration page and, according to this guide-phrase, characters to be registered are input by operating the character-keys of the keyboard 4 (Step 4).

In Step 6, a judgment is formed as to whether the determination key 22 has been operated or not. If not, the stage proceeds to Step 7. In Step 7, a judgment is formed as to whether characters have been input by operating the character-keys or not. If affirmative, the stage proceeds to Step 8. The input characters are displayed on the registration screen in Step 8, and the stage is shifted from Step 8 to Step 4. If not in Step 7, the stage is immediately shifted from Step 7 to Step 4. In other words, the procedures of Steps 4, 5, and 7 are repeatedly carried out until the determination key 22 is pressed. When "COM", for example, is input by operating the character-keys, "COM" appears on the registration screen displayed on the display portion 10, as shown in FIG. 4 (Step 8). If a command is additionally input, a mark representing the command also appears on the same page.

When the determination-key 22 is pressed, a "yes" judgment is formed in Step 5, and the stage proceeds to Step 8. In Step 6, character data about "COM" is stored in the memory 58 in correspondence with key M1. If a command has been already input, the command is also stored in the memory 58 in correspondence with key M1. Thereafter, the stage is shifted from Step 6 to Step 1 where the original screen, namely, the input screen for inputting characters to be printed by operating the character-keys is again displayed on the display portion 10.

Figures 5A, 5B:
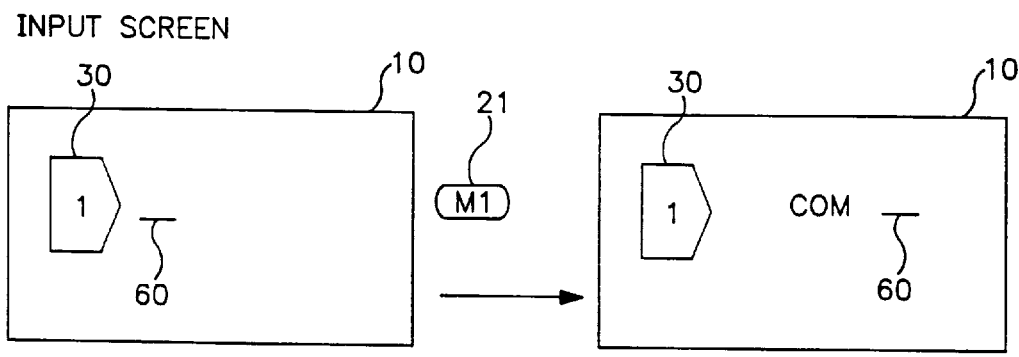
FIG. 5(A) is a descriptive drawing of an input screen.
FIG. 5(B) is a descriptive drawing showing a state in which input characters have appeared on the screen.

For example, an input screen shown in FIG. 5(A) is again displayed on the assumption that the input screen appearing before pressing the registration-key 21 in Step 2 is that shown in FIG. 5(A). In this drawing, reference numeral 30 designates a mark of a block changing command, and reference numeral 60 designates a cursor. The block changing command is used to indicate the division of blocks. A space between the mark 30 and another mark 30 nearest to the preceding mark 30 is defined as one block. The number "1" shown on the mark 30 designates a line number and means that an input character following the mark 30 is printed at a first line of, for example, a label tape.

If key M1 is pressed when the input screen is in a state shown in FIG. 5(A), the character string "COM" whose front letter is located at the position of the cursor is displayed. In other words, the character string "COM" is displayed following the mark 30, and thereby the cursor 60 is moved behind the character string "COM". Additionally, data about the character string "COM" is stored in the memory portion 8. A print execution key is then operated, so that the character data stored in the memory portion 8 is read to execute printing.

As mentioned above, by pressing key M1, the display portion 10 is caused to display the character string "COM" at the position of the cursor 60 and, at the same time, data about the character string "COM" is stored in the memory portion 8. Accordingly, the operation of repeatedly inputting the character string "COM" is easily carried out.

When is required to print, for example, the character strings "COM 1" through "COM 5" on the respective blocks is merely to set a consecutive-number function and press key M1 five times. Data about the character strings "COM 1" through "COM 5" is immediately input by this easy operation. If the character string "COM" as well as the mark 30 is registered in correspondence with key M1, operational efficiency is further improved because there is no need to input the mark 30 by means of a command-key when the character string "COM" is input per each block.

Additionally, if the character string "XY" is registered in correspondence with key M 2 and other character strings are registered in correspondence with keys M3 through M10 respectively, the input operation is easily carried out when inputting the character strings "COM 1" through "COM 5", "XY 01", "COM 6" through "COM 10", "XY 02" through "XY 07", etc.

In the above embodiment, a description was given of a case in which character strings or commands relative to the character strings are registered. If other commands are repeatedly used together with the mark 30, only these commands may be registered in correspondence with any one of keys M1 through M10.

Second Embodiment

Figure 6:
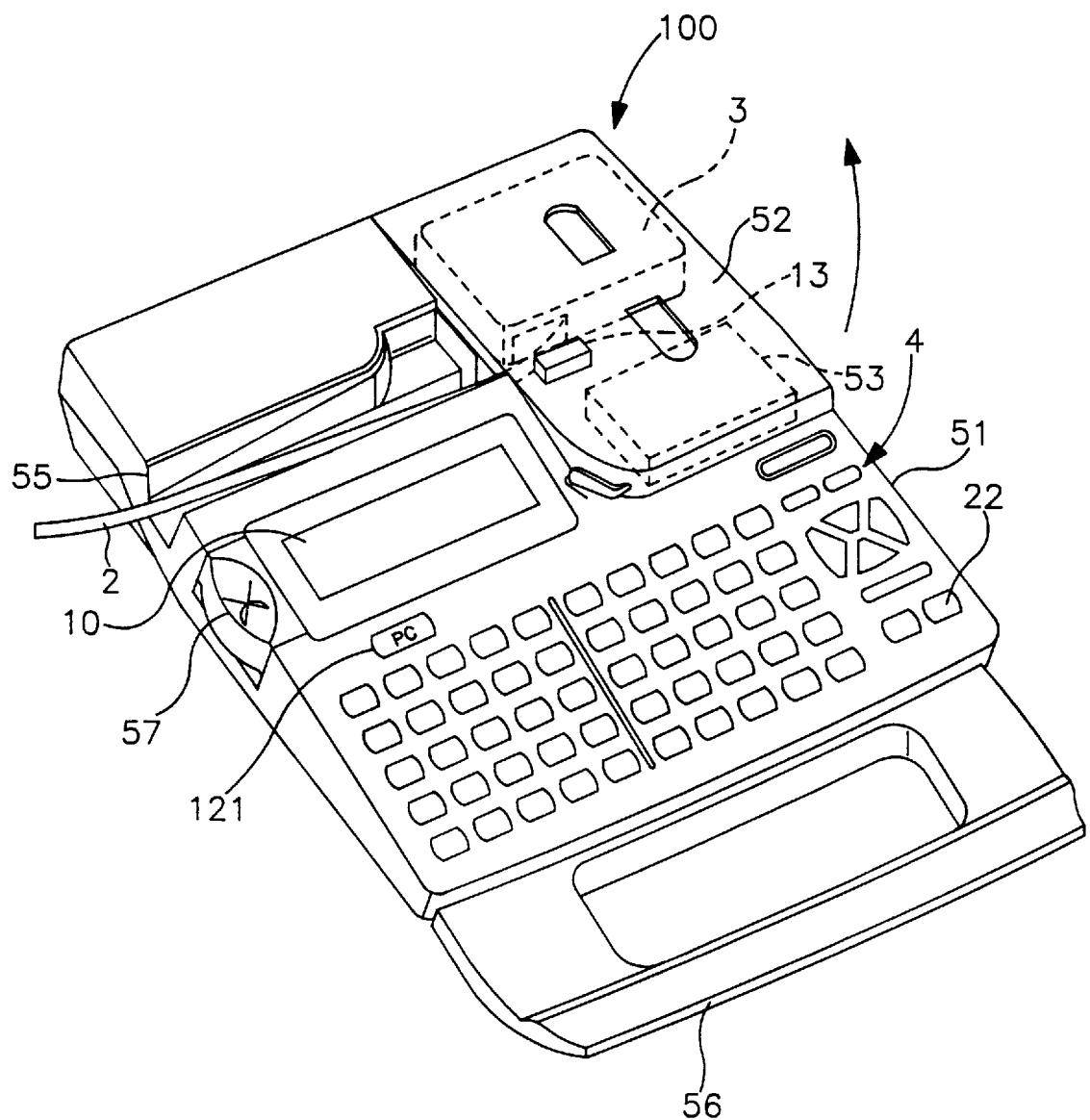
FIG. 6 is a perspective view of the exterior of a tape printer according to a second embodiment of the present invention.
Figures 8A, 8B:
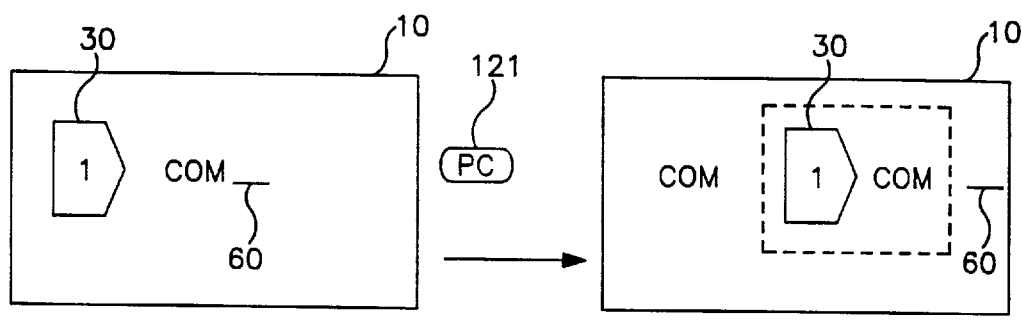
FIG. 8(A) is a descriptive drawing of a screen shown before a character string is copied.
FIG. 8(B) is a descriptive drawing of the screen shown after the character string is copied.

FIG. 6 shows a tape printer 100 according to a second embodiment of the present invention. A PC key 121 is mounted in a key portion 4 of the main body 51 of the tape printer 100. As shown in FIG. 8(A), the PC key 121 is used to copy a block changing mark 30 and the character string "COM" situated between the mark 30 and a cursor 60. Except for this, the arrangement of keys in the second embodiment is the same as that in the first embodiment, and therefore a description of it will be omitted. In addition, except for the memory 58 shown in FIG. 2 which is not required in the second embodiment, the construction of a control system of the tape printer 100 in the second embodiment is the same as that shown in FIG. 2, and therefore a description of it will be omitted.

Figure 7:
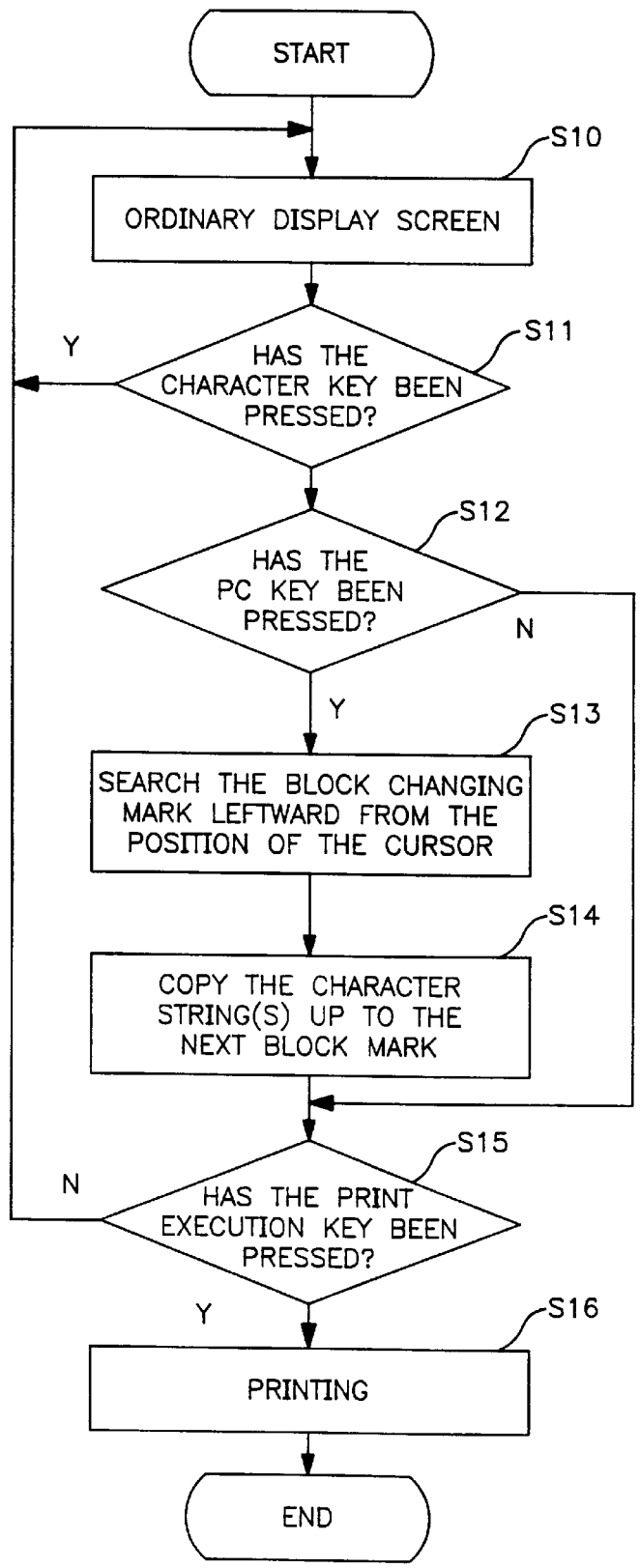
FIG. 7 is a flowchart of the operation of the tape printer in the second embodiment.

The operation of the tape printer 100 will now be described with reference to a flowchart of FIG. 7.

First of all, a main switch (not shown) is turned on to actuate a controller 6 (see FIG. 2) and the respective circuits. Thereby, a display portion 10 displays a picture of an ordinary screen (Step 10). Since the ordinary screen is the same as that shown in the first embodiment, a description of it is omitted.

Viewing the ordinary screen, a desired print-format or a setting mode is selected by operating a selection key. The selected print format or setting mode is stored in the memory portion 8. Thereafter, in Step 11, a judgment is formed as to whether characters or control commands have been input or not. If affirmative, the stage returns to Step 10. In other words, while the characters or commands are being input by operating character keys or command keys, the procedures of Steps 10 and 11 are repeatedly carried out.

If a block changing command and the character string "COM", for example, are input by operating command-keys and character-keys at this time, the mark 30 representing the block changing command and the character string "COM" are displayed as shown in FIG. 8(A), and data about the block changing command and the character string "COM" is stored in the memory portion 8 (see FIG. 2).

In order to print the character string "COM", a print execution key is operated. Since the character keys and the PC key 121 are not operated at this time, a negative judgment (a "no" judgment) is formed in Steps 11 and 12, and the stage proceeds to Step 15. In Step 15, a judgment is formed as to whether the print execution key has been operated or not. If not, the stage returns to Step 10, but an affirmative judgment is formed in Step 15 because the print execution key has been operated in fact. Accordingly, the stage proceeds to Step 16 where printing is carried out and completed.

In order to successively print the character string "COM" on each block, the cursor 60 is moved to a position indicated in FIG. 8(A), and then the PC key 121 is pressed. Since any one of the character keys is not operated at this time, a negative judgment is formed in Step 11. The stage proceeds to Step 12. Since the PC key 121 has been pressed, an affirmative judgment is formed in Step 12. The stage proceeds to Step 13.

In Step 13, the mark 30 is searched leftward (in FIG. 8(A)) from the position of the cursor 60. As a result, the located mark 30 and the character string "COM" situated between the located mark 30 and the cursor 60 are displayed at the position of the cursor 60 (Step 14). In other words, as shown in FIG. 8(B), the display portion 10 displays the character string "COM", the mark 30, and the character string "COM" in order of mention. As a result, the cursor 60 is moved next to the end of the displayed characters (i.e., next to the rightmost letter "M" in FIG. 8(B)).

On the other hand, data about the mark 30 and the character string "COM" enclosed by the dotted line shown in FIG. 8(B) is stored in the memory portion 8 (Step 14).

By again operating the PC key 121, the display portion 10 displays another mark 30 and another character string "COM" next to the character string "COM" enclosed by the dotted line, and data about the newly displayed ones is stored in the memory portion 8. The mark 30 and the character string "COM" enclosed by the dotted line are moved leftward.

In Step 15, a judgment is formed as to whether the print execution key has been operated or not. If not, the stage returns to Step 10. The procedures of Steps 10 through 15 are repeatedly carried out while the PC key 121 is being operated. When the print execution key is operated, a "yes" judgment is formed in Step 16, and the stage proceeds to Step 16. In Step 16, the character strings and the commands which have been input, namely, the character data and the command data stored in the memory portion 8 are read, so that the character string "COM" is successively printed on each block of the tube 2 in an intended printing style. In this way, all the procedures are completed.

What is required when the same character is repeatedly printed is merely to operate the PC key 121. As a result of the operation of the PC key 121, the same character string and the same command can be repeatedly input. This is a simple operation.

Figures 9A, 9B:
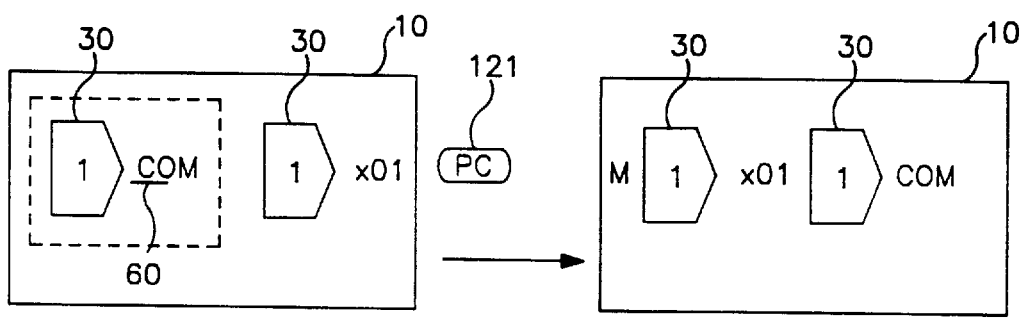
FIG. 9(B) is a descriptive drawing of the screen shown after the character string and the like are copied.

In the second embodiment, the mark 30 and the character string "COM" are copied at the position of the cursor 60 whenever the PC key 121 is pressed. Instead, as shown in FIG. 9, the mark 30 and the character string "COM" may be copied at the position next to the last character "1" of the displayed characters which extend rightward. In this case, data about the mark 30 and the character string "COM" is likewise stored in the memory portion 8.

Further, in the second embodiment, both of the command and the character string are copied. Instead, only one of the command and the character string may be copied. Further, instead of copying one block ranging from the cursor 60 to the mark 30, a range from the cursor 60 to the end character of the displayed characters may be copied.

Third Embodiment

Figure 10:
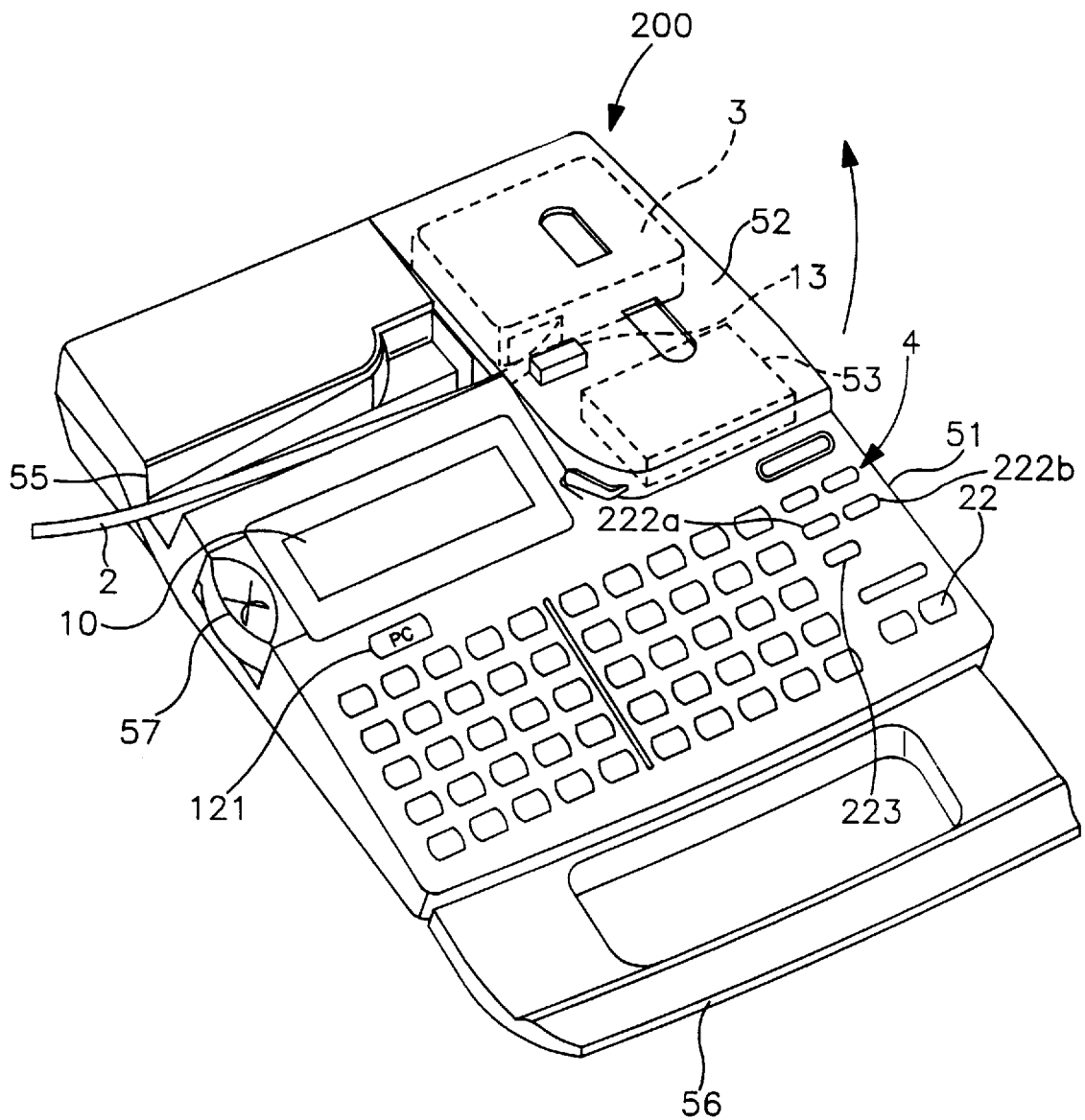
FIG. 10 is a perspective view of the exterior of a tape printer according to a third embodiment of the present invention.

FIG. 10 shows a tape printer 200 according to a third embodiment of the present invention. A right jump key 222a, a left jump key 222b, and a block designating key 223 for designating a specific block onto which the cursor 60 is jumped are mounted on the key portion 4 of the main body 51 of the tape printer 200.

As shown in FIG. 12, the display portion 10 displays input characters, the command mark 30, and an order indicator 10M which indicates the ordinal position of a block in which the cursor 60 is situated. The number displayed on the order indicator 10M represents the ordinal position of the block. Since the other arrangement is the same as those in the first and second embodiments, its description is omitted.

Figure 11:
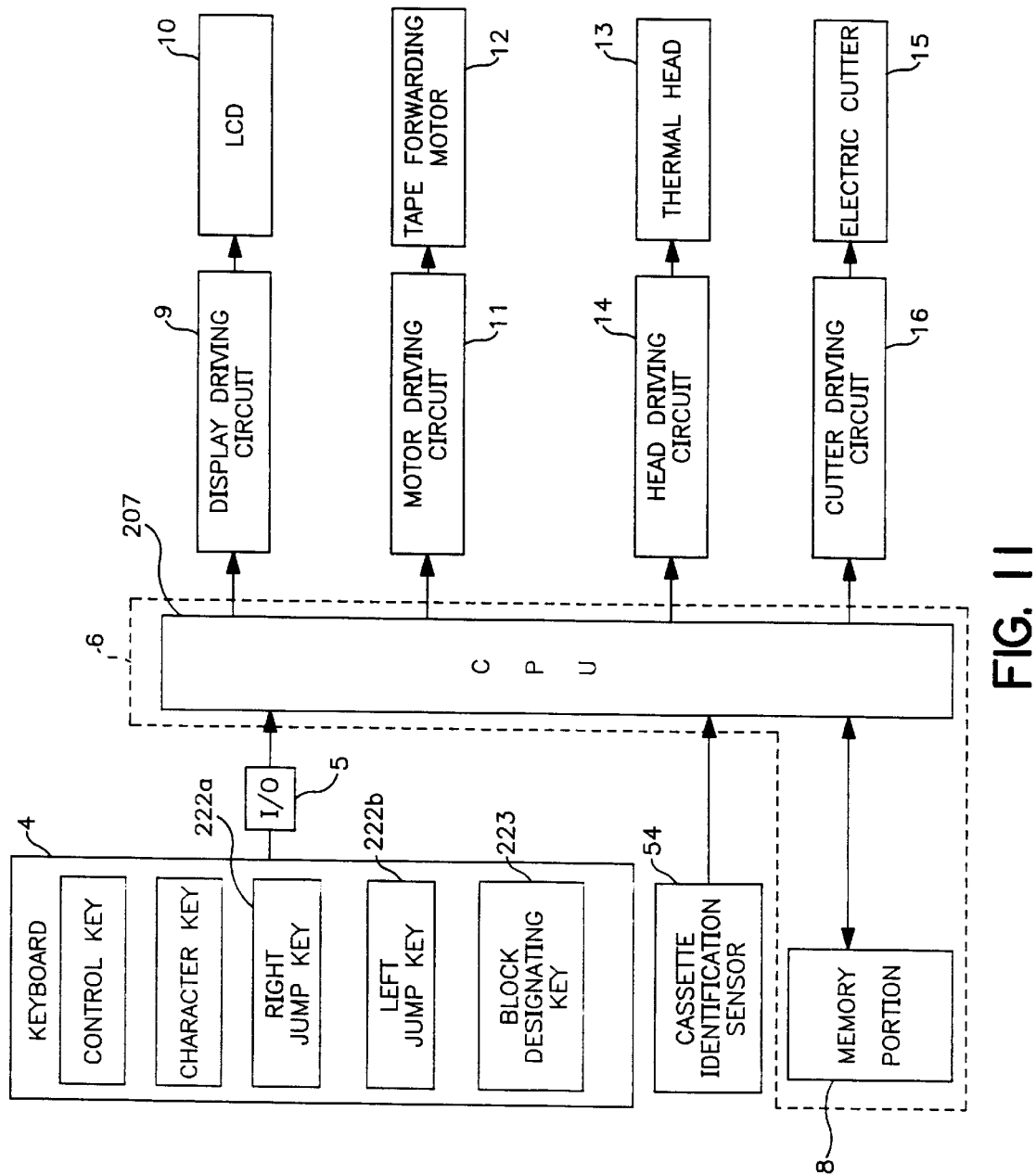
FIG. 11 is a block diagram of the construction of a control system of the tape printer according to the third embodiment.

FIG. 11 shows the construction of a control system of the tape printer 200. A CPU 207 shown in FIG. 11 functions as a means for forwarding the cursor 60 fast and additionally as a means for jumping the cursor 60 per each block. The CPU 207 has the same functions as those of the CPU 7 (see FIG. 2).

Figure 15:
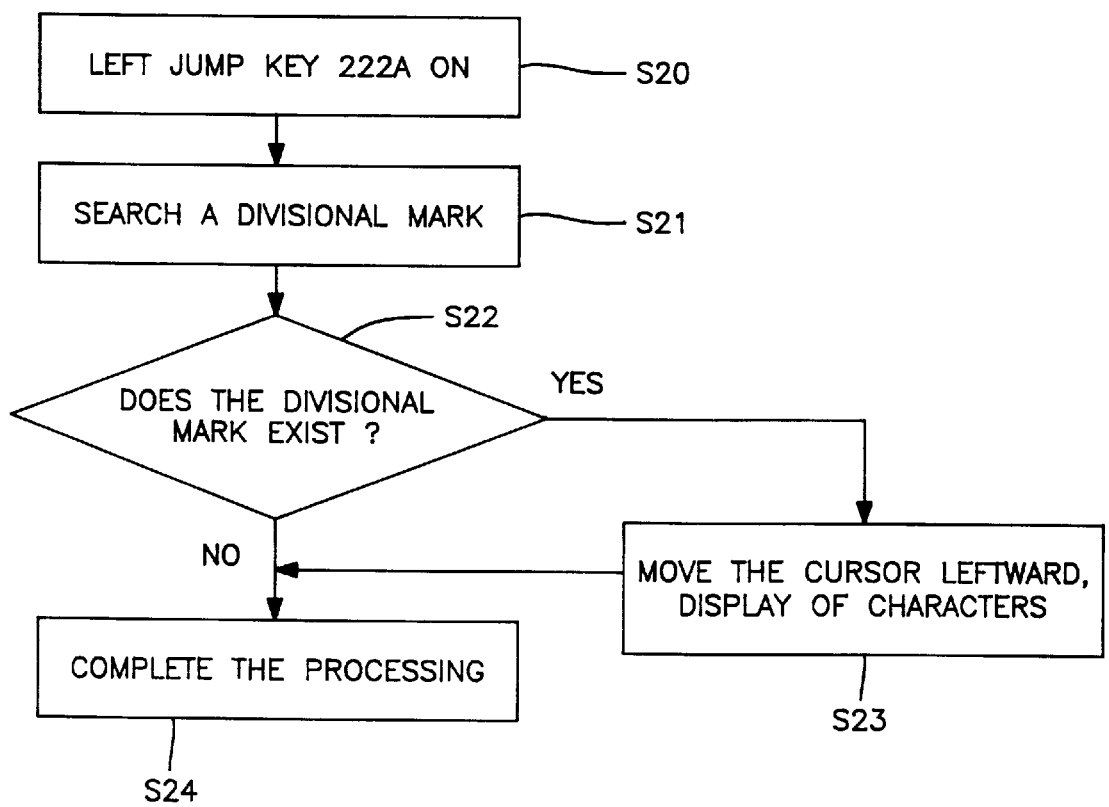
FIG. 15 is a flowchart of the operation for jumping the cursor.
Figure 16:
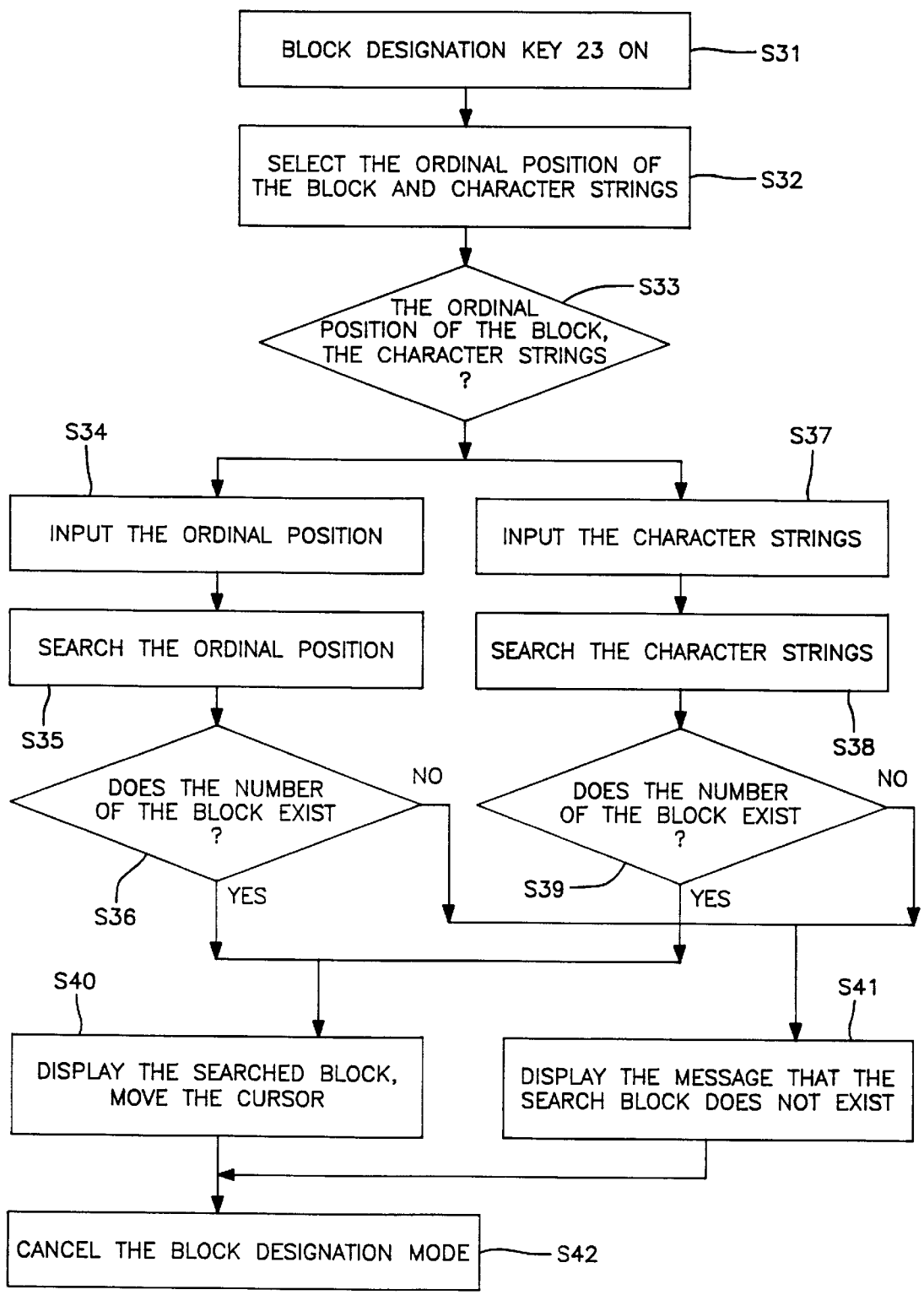
FIG. 16 is a flowchart of the operation of a jump mode.

The operation of the tape printer 200 will now be described with reference to flowcharts of FIGS. 15 and 16.

First, a main switch (not shown) is turned on to actuate the controller 6 and the respective circuits. Character strings and commands are then input. For example, when the character strings "A11". "A12", "A13" and a block changing command are input, the display portion 10 displays the mark 30 representing the block changing command and the character strings "A12" and "A13". The order indicator 10M of the display portion 10 displays, for example, the number "28" which represents the ordinal position of a block Pn to which the character string "A13" belongs. In this way, the ordinal position of the block to which the currently input character string belongs is shown.

Figures 12A, 12B, 12C:
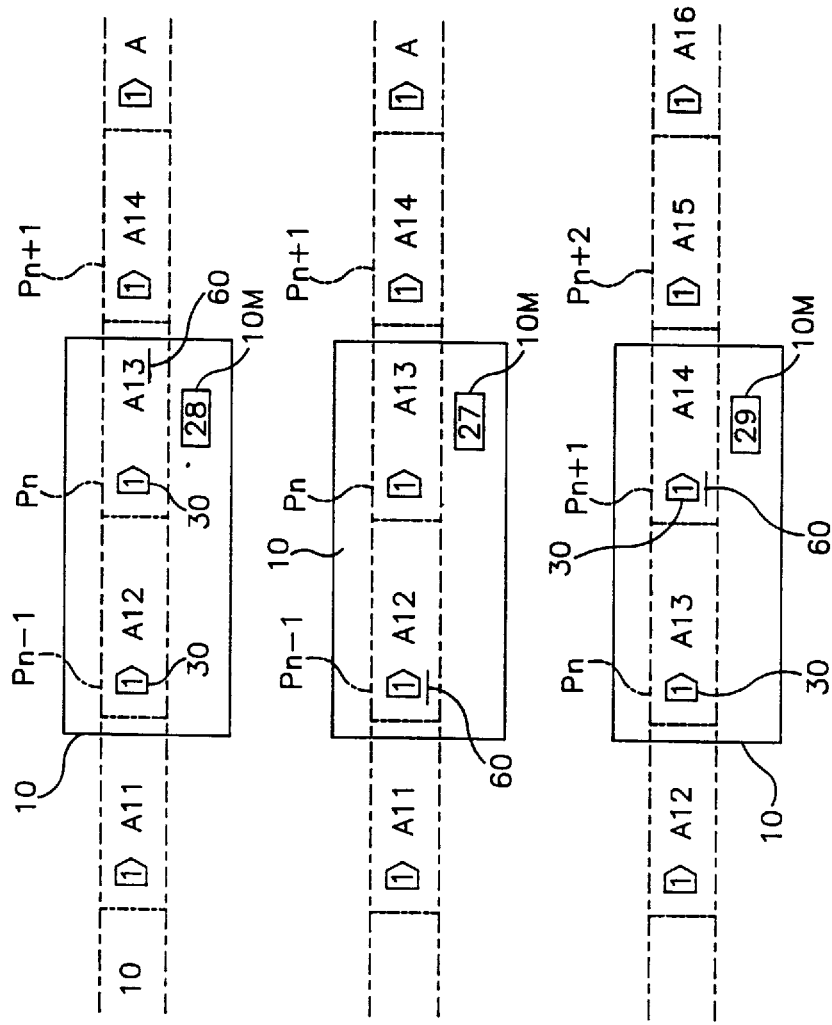
FIG. 12(a) is a descriptive drawing of blocks including character strings and a cursor displayed on the display portion.
FIG. 12(b) is a descriptive drawing showing a state in which the cursor of FIG. 12(a) is moved by one block forwards.
FIG. 12(c) is a descriptive drawing showing a state in which the cursor of FIG. 12(a) is moved by one block backwards.

When a block changing command and the character strings "A14", . . . are input and the cursor 60 is moved to the position of the block Pn, the display portion 10 displays the command mark 30 and the character strings "A13" and "A12" as shown in FIG. 12(a). The order indicator 10M of the display portion 10 displays the number "28" which represents the ordinal position of the block Pn in which the cursor 60 is situated.

When the left jump key 222b is pressed once in this state (Step 20), the mark 30 on the left side begins to be searched in Step 21. In Step 22, a judgment is formed as to whether the mark 30 exists or not. If not, the procedures are completed. If the judgment is affirmative, the stage proceeds to Step 23. Since the mark 30 exists in a block $P_{n-1}$ in this case, an affirmative judgment is formed in Step 22, and the stage proceeds to Step 23.

In Step 23, the cursor 60 is moved to the position of the mark 30 belonging to the block $P_{n-1}$. The display portion 10 shows the command marks 30 and 30, and the character strings "A12" and "A13". The order indicator 10M of the display portion 10 indicates the number "27" which represents the ordinal position of the block $P_{n-1}$.

By pressing the left jump key 222b again, the cursor 60 is moved to the position of the mark 30 belonging to the block $P_{n-2}$ in the same way as above. The display portion 10 shows the command marks 30 and 30, and the character strings "A11" and "A12". The order indicator 10M indicates the number "26" which is the ordinal position of the block $P_{n-2}$.

As mentioned above, whenever the left jump key 222b is pressed, the cursor 60 is moved to each block, and the order indicator 10M indicates the ordinal position of a block P into which the cursor 60 has been moved.

On the other hand, when the right jump key 222a is pressed once in the state of FIG. 12(a), the cursor 60 is moved to the position of the mark 30 belonging to the block $P_{n+1}$ in the same way as above. The display portion 10 shows the command marks 30 and 30, and the character strings "A13" and "A14", as shown in FIG. 12(c). The order indicator 10M indicates the number "29" which represents the ordinal position of the block $P_{n+1}$.

By pressing the right jump key 222a again, the cursor 60 is moved to the position of the mark 30 belonging to the block $P_{n+1}$. The display portion 10 shows the command marks 30 and 30, and the character strings "A14" and "A15". The order indicator 10M indicates the number "30" which represents the ordinal position of the block $P_{n+1}$.

As mentioned above, whenever the right jump key 222a is pressed, the cursor 60 is moved to each block, and the order indicator 10M of the display portion 10 indicates the ordinal position of the block P into which the cursor 80 has been moved.

When the character strings which have been input are corrected, the left or right jump key 222b or 222a is pressed, so that the cursor 60 is moved to each block. Therefore, the cursor 60 can be moved to a desired block P in a short time, and accordingly character correction can be efficiently carried out.

The cursor 60 is designed to be moved to each block in turn even if the jump key 222b or 222a is continuously pressed.

A description will now be given of a case in which the block designating key 223 is used.

Figure 13A:
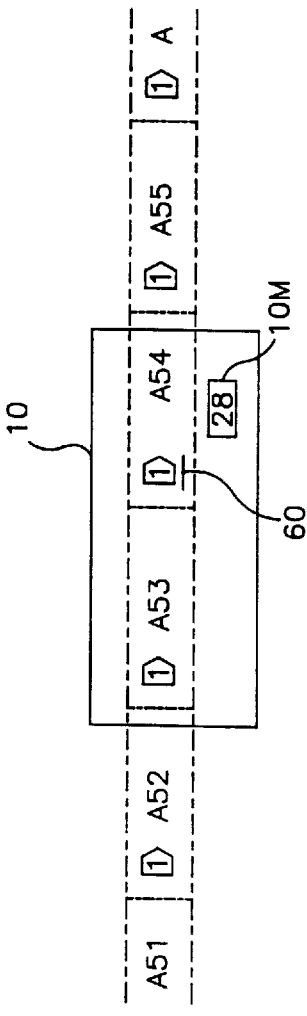
FIG. 13(a) is a descriptive drawing of the display portion shown before the cursor is jumped.
Figure 13B:
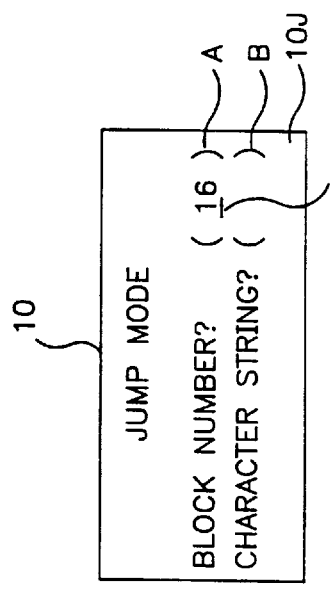
FIG. 13(b) is a descriptive drawing of a jump mode screen.

If the block designating key 223 is pressed when the display portion 10 displays a picture shown in FIG. 13(a) (Step 31), a jump mode screen 10J for setting a jump mode is displayed on the screen of the display portion 10, as shown in FIG. 13(b). A guide to a "block number" and a "character string" appears on the jump mode screen 10J (Step 32). When a block number is appointed, a block jump mode according to which the cursor 60 is moved to a block having a specific ordinal position is set. When a character string is appointed, the appointed character string is searched, and a character string jump mode is set according to which the cursor 60 is moved to a block to which the searched character string belongs (Step 33).

For example, when the number "16" is inserted into square brackets A for appointing a "block number" (Step 34) and the execution key is pressed, a 16th block P16 is searched (Step 16). A judgment is formed as to whether the block P16 exists or not in Step 36. If not, the stage proceeds to Step 41 where the display portion 10 displays a message stating that a block P identical with the block P16 does not exist. The stage then proceeds to Step 42 where the jump mode is canceled.

Figure 13C:
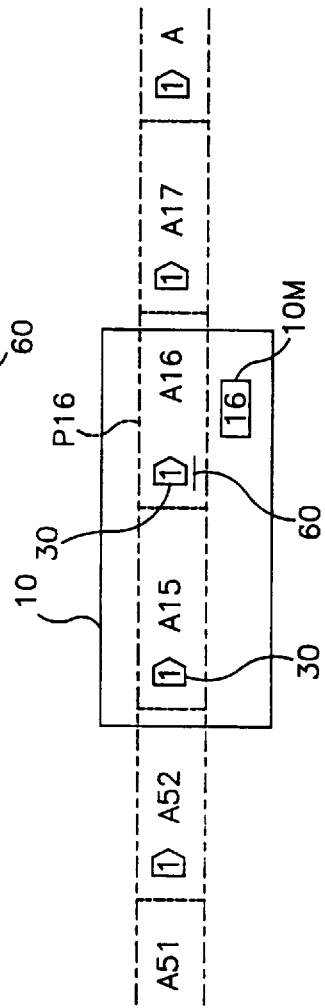
FIG. 13(c) is a descriptive drawing of the display portion shown when the cursor is jumped.

If a "yes") judgment is formed in Step 36, the stage proceeds to Step 40. In Step 40, the cursor 60 is moved to the position of the mark 30 of the block P16. The display portion 10 displays the mark 30, the character string "A15", the mark 30, and the character string "A16", as shown in FIG. 13(c). The stage proceeds to Step 42 where the jump mode is canceled.

For example, when the character string "CO1" is inserted into square brackets B for appointing a "character string" (Step 37) and the execution key is pressed, the character string "CO1" is searched (Step 38). A judgment is formed as to whether the character string "CO1" exists or not in Step 39. If not, the stage proceeds to Step 41 and, if affirmative, the stage proceeds to Step 40.

Figure 14A:
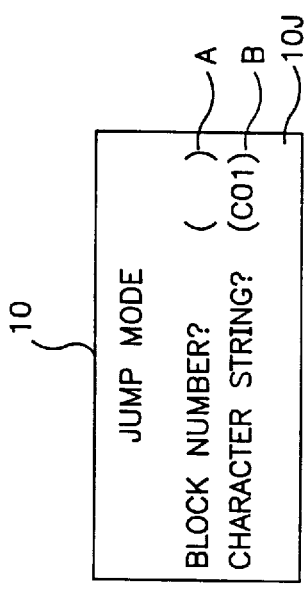
FIG. 14(a) is a descriptive drawing of a jump mode screen.
Figure 14B:
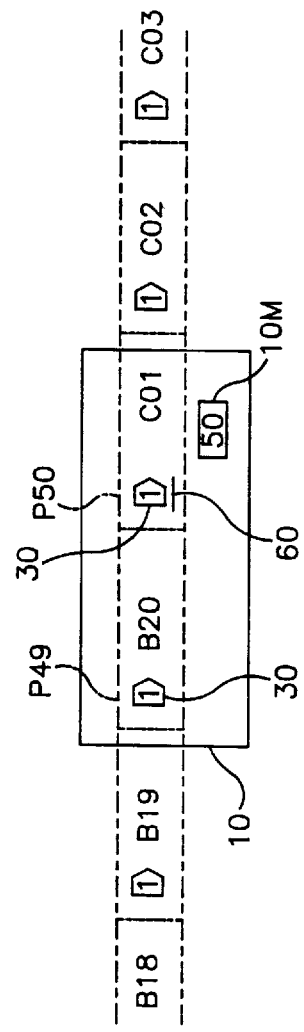
FIG. 14(b) is a descriptive drawing of the display portion shown when the cursor is jumped to a block including a desired character string.

In Step 40, the cursor 60 is moved to the position of the mark 30 of the block P50. The display portion 10 displays the mark 30, the character string "B20", the mark 30, and the character string "CO1", as shown in FIG. 14(b). The order indicator 10M indicates the number "50" which represents the ordinal position of the block 50 to which the character string "CO1" belongs.

As mentioned above, only by pressing the block designating key 223 and inputting a block having a desired ordinal position or desired character string and pressing the execution key, the cursor 60 can jump onto a desired block P to which the desired character string belong. Accordingly, there is no need to move the cursor 60 by one character space in turn. Therefore, the operation for moving the cursor 60 is easily carried out and, in addition, character strings can be efficiently corrected.

In the third embodiment, the cursor jump keys 222a, 222b, and the block designating key 223 are individually arranged in the keyboard 4. Instead, the cursor 60 may be jumped by pressing variously combined keys, such as a combination of a shift key with one of character keys or a combination of a mode selection key (e.g., an escape key) with another mode selection key.

What is claimed is:

1. In a tape printer comprising:

input means for inputting character strings to be printed on each block which is defined in a label tape or a label tube and inputting control commands by which an output format of said character strings is controlled;

display portion for displaying said character strings and said control commands which have been input;

storage means for storing said character strings and said control commands which have been input; and printing means for printing said character strings stored in said storage means on each block of said label tape or said label tube on the basis of said control commands stored in said storage means;

said tape printer further comprising:

registration means for registering one block of said character strings which have been displayed on said display portion in correspondence with a specific key; and copying means for causing said character strings registered by said registration means to be copied onto a predetermined position of said display portion whenever said specific key is operated, so that operations for inputting said character strings are facilitated.

2. A tape printer as recited in claim 1, wherein said registration means also registers the control commands of the character strings.

3. A tape printer as recited in claim 1, wherein said registration means registers the character strings which occupy one block.

4. The tape printer of claim 1, wherein a user selects character strings to be registered by said registration means.

5. In a tape printer comprising:

input means for inputting character strings to be printed on each block which is defined in a label tape or a label tube and inputting block commands by which the block is set;

display portion for displaying at a position of a cursor said character strings and said block commands which have been input;

storage means for storing said character strings and said block commands which have been input; and printing means for printing said character strings stored in said storage means on each block of said label tape or said label tube on the basis of said block commands stored in said storage means;

said tape printer further comprising:

a copying key for causing character strings ranging from the position of the cursor displayed on said display portion to said block commands to be copied onto said position of the cursor of said display portion, so that operations for inputting said character strings are facilitated.

6. A tape printer as recited in claim 5, wherein said copying key also copies the block commands besides said character strings.

7. The tape printer of claim 5, wherein a user selects character strings to be registered by said copying key.

8. The tape printer of claim 5, further comprising cursor moving means for, when character strings are copied by said copying key, moving the cursor behind the copied character strings.

\* \* \* \* \*